(12) United States Patent
Kao et al.

(10) Patent No.: US 11,578,182 B2
(45) Date of Patent: Feb. 14, 2023

(54) CONDUCTIVE POLYMERIC COMPOSITION AND FIBER YARN

(71) Applicant: Wendell Industrial Co., Ltd., New Taipei (TW)

(72) Inventors: Chih-Hung Kao, New Taipei (TW); Tzu-Chung Lu, New Taipei (TW); Yin-Lin Lee, New Taipei (TW); Chih-Hua Lin, New Taipei (TW); Ya-Yu Huang, New Taipei (TW)

(73) Assignee: Wendell Industrial Co., Ltd., New Taipei (TW)

( * ) Notice: Subject to any disclaimer, the term of this patent is extended or adjusted under 35 U.S.C. 154(b) by 135 days.

(21) Appl. No.: 17/116,551

(22) Filed: Dec. 9, 2020

(65) Prior Publication Data

US 2021/0253824 A1 Aug. 19, 2021

(30) Foreign Application Priority Data

Dec. 27, 2019 (TW) .................. 108148153

(51) Int. Cl.
| | | |
|---|---|---|
| *C08K 3/04* | (2006.01) | |
| *C08K 5/00* | (2006.01) | |
| *C08L 67/08* | (2006.01) | |
| *C08L 77/02* | (2006.01) | |
| *D02G 3/04* | (2006.01) | |
| *C08J 5/00* | (2006.01) | |
| *C08J 3/12* | (2006.01) | |

(52) U.S. Cl.
CPC ............ *C08K 3/041* (2017.05); *C08J 3/12* (2013.01); *C08J 5/005* (2013.01); *C08K 5/005* (2013.01); *C08L 67/08* (2013.01); *C08L 77/02* (2013.01); *D02G 3/045* (2013.01); *C08K 2201/001* (2013.01); *C08K 2201/011* (2013.01); *C08L 2203/12* (2013.01); *D10B 2331/02* (2013.01); *D10B 2331/04* (2013.01); *D10B 2401/16* (2013.01)

(58) Field of Classification Search
CPC ........ C08K 3/041; C08K 13/02; C08K 5/005; C08K 5/10; C08K 5/103; C08K 2201/001; C08K 2201/0011; C08K 2201/004; C08L 67/08; C08L 77/02; D01B 2331/02; D01B 2331/04
See application file for complete search history.

(56) References Cited

U.S. PATENT DOCUMENTS

| | | | | |
|---|---|---|---|---|
| 6,331,265 | B1* | 12/2001 | Dupire ................ | C08K 3/041 |
| | | | | 977/788 |
| 7,423,084 | B2* | 9/2008 | Marissen ............. | D01F 6/04 |
| | | | | 524/495 |
| 8,216,492 | B2* | 7/2012 | Chang .................. | C08J 3/226 |
| | | | | 252/511 |
| 2005/0208286 | A1* | 9/2005 | Hartmann ........... | C08L 23/06 |
| | | | | 428/292.1 |
| 2011/0017957 | A1* | 1/2011 | Gaillard ............... | D01F 1/09 |
| | | | | 977/932 |
| 2011/0251341 | A1* | 10/2011 | Touraud .............. | C08G 69/265 |
| | | | | 977/742 |
| 2015/0118430 | A1* | 4/2015 | Korzhenko ......... | C08L 23/06 |
| | | | | 442/365 |
| 2017/0066907 | A1* | 3/2017 | Choi .................... | C08K 7/24 |
| 2019/0237224 | A1* | 8/2019 | Heinemann ......... | H01C 7/028 |

FOREIGN PATENT DOCUMENTS

| | | | | |
|---|---|---|---|---|
| CN | 108796829 | A | 11/2018 | |
| DE | 102017113884 | A1 * | 12/2017 | ........... H01C 7/02 |
| TW | 2018/27555 | A | 8/2018 | |

OTHER PUBLICATIONS

Search Report issued in Taiwanese application No. 108148153 dated Aug. 12, 2020.

* cited by examiner

*Primary Examiner* — Jane L Stanley
(74) *Attorney, Agent, or Firm* — Cesari & McKenna, LLP

(57) ABSTRACT

A conductive polymeric composition includes, based on a total weight of the conductive polymeric composition, 0.1 wt % to 10 wt % of carbon nanotubes, 0.2 wt % to 4 wt % of a first component, 0.1 wt % to 4 wt % of a second component made by esterification of a $C_{16}$-$C_{30}$ fatty acid with a polyol compound, and the balance being a polymeric component. When the first component is a first polymer obtained from polycondensation of an aromatic diacid compound and an aliphatic glycol compound, the polymeric component is a polyester. When the first component is a second polymer obtained from polycondensation of a lactam compound, a diamine compound and a dicarboxylic acid compound, the polymeric component is a polyamide.

20 Claims, 1 Drawing Sheet

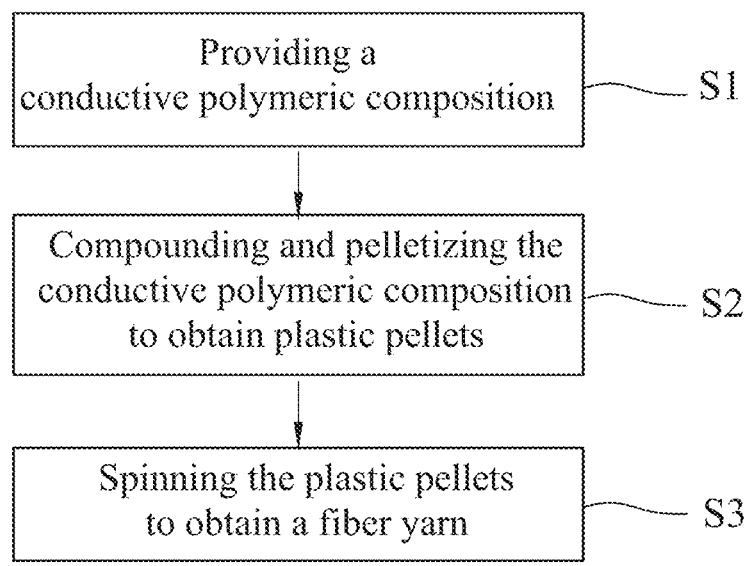

CONDUCTIVE POLYMERIC COMPOSITION AND FIBER YARN

CROSS-REFERENCE TO RELATED APPLICATION

This application claims priority of Taiwanese Invention Patent Application No. 108148153, filed on Dec. 27, 2019.

FIELD

This disclosure relates to a material for making a fiber yarn, and more particularly to a conductive polymeric composition adapted for preparing a fiber yarn.

BACKGROUND

In order to make a conductive fiber, carbon nanotubes are added to a polymeric component (such as polyester and polyamide) so as to impart conductive property to the fiber made therefrom. However, a deficient amount of carbon nanotubes would adversely affect the conductivity of the fiber made therefrom, whereas an excess amount of carbon nanotubes would easily cause blockage of a spinneret, resulting in filament breakage during spinning process, and thus hinders mass production of the fiber. In particular, filament breakage of a multifilament yarn used for preparing a conductive fiber is a challenging issue since the holes of the spinneret for making the multifilament yarns are relatively small as compared to that for making a monofilament yarn. That is, each of the filaments in the multifilament yarn has a relatively smaller size, which may be prone to filament breakage when wound into a bundle of yarn, thereby hampering the mass production of the multifilament yarn.

Therefore, there is still a need to develop a polymeric composition adapted for making a multifilament yarn exhibiting improved conductivity and spinnability.

SUMMARY

Therefore, an object of the present disclosure is to provide a conductive polymeric composition and a fiber yarn that can alleviate at least one of the drawbacks of the prior art.

According to one aspect of the present disclosure, the conductive polymeric composition includes, based on a total weight of the conductive polymer composition, 0.1 wt % to 10 wt % of carbon nanotubes, 0.2 wt % to 4 wt % of a first component, 0.1 wt % to 4 wt % of a second component, and the balance being a polymeric component which is different from the first and second components.

The first component is one of a first polymer and a second polymer. The first polymer is obtained from polycondensation of a first mixture including an aromatic diacid compound and an aliphatic glycol compound. The aromatic diacid compound includes terephthalic acid, and the aliphatic diglycol compound is selected from the group consisting of ethylene glycol, butanediol, hexanediol, diglycol, triglycol, polyethylene glycol, and combinations thereof. The second polymer is obtained from polycondensation of a second mixture including a lactam compound, a diamine compound, and a dicarboxylic acid compound. The lactam compound is selected from the group consisting of caprolactam, dodecane-12-lactam, and a combination thereof. The diamine compound includes hexamethylene diamine. The dicarboxylic acid compound is selected from the group consisting of adipic acid, azelaic acid, sebacic acid, dodecanedioic acid, benzenedicarboxylic acid, naphthalic acid, and combinations thereof. The second component is made by esterification of a $C_{16}$-$C_{30}$ fatty acid with a polyol compound. When the first component is the first polymer, the polymeric component is a polyester. When the first component is the second polymer, the polymeric component is a polyamide.

According to another aspect of the present disclosure, the fiber yarn includes a plurality of filaments, each of which is made from the conductive polymeric composition as mentioned above.

BRIEF DESCRIPTION OF THE DRAWINGS

Other features and advantages of the present disclosure will become apparent in the following detailed description of the embodiments with reference to the accompanying drawing, of which:

FIG. 1 is a flow chart illustrating consecutive steps for making a fiber yarn of this disclosure.

DETAILED DESCRIPTION

The present disclosure provides a conductive polymeric composition which includes carbon nanotubes, a first component, a second component, and the balance being a polymeric component.

Polymeric Component

The polymeric component is different from the first and second components. The polymeric component may be a high-molecular weight polymer commonly used in filament production, such as a polyester or a polyamide.

Examples of the polyester suitable for use in this disclosure may include, but are not limited to, polyethylene terephthalate, polybutylene terephthalate, polyhexylene terephthalate, and combinations thereof.

Examples of the polyamide suitable for use in this disclosure may include, but are not limited to, Nylon-6, Nylon-6,6, Nylon-6,10 and Nylon-6,12, and combinations thereof.

Carbon Nanotubes

The carbon nanotubes refer to a tube-shaped material made of carbon and having a diameter measured in nanometer scale. For example, the carbon nanotubes have a diameter ranging from 5 nm to 20 nm. The carbon nanotubes may have a size (i.e., a length or particle size) that ranges from 0.5 µm to 1 µm, such as 0.6 µm, 0.7 µm, 0.8 µm or 0.9 µm.

For making a fiber yarn containing multiple filaments each having a diameter that is much smaller than that of a monofilament yarn, the size of the carbon nanotubes may be not greater than 1 µm, so as to prevent spinneret blockage and filament breakage during the spinning process.

When the size of the carbon nanotubes is shorter than 0.5 µm, conductive networks between the carbon nanotubes may not be sufficiently formed, leading to a product (such as a fiber yarn) made from the conductive polymeric composition having a low conductivity.

The carbon nanotubes are present in an amount ranging from 0.1 wt % to 10 wt % based on a total weight of the conductive polymeric composition. In certain embodiments, the amount of the carbon nanotubes is n wt %, where n is an integer ranging from 1 to 10. When the amount of the carbon nanotubes is lower than 0.1 wt %, a product made from the conductive polymeric composition may exhibit no conductive or antistatic properties. When the amount of the carbon nanotubes is higher than 10 wt %, spinneret blockage and/or filament breakage might occur during the spinning process, causing a poor spinnability.

First Component

The first component may be a first polymer or a second polymer. When the first component is the first polymer, the polymeric component is a polyester. When the first component is the second polymer, the polymeric component is a polyamide.

First Polymer

The first polymer is obtained from polycondensation of a first mixture including an aromatic diacid compound and an aliphatic glycol compound. The first polymer is capable of assisting dispersion of the carbon nanotubes in the polyester.

As used herein, the term "aromatic diacid compound" is intended to denote a dicarboxylic acid compound, or a derivative thereof including at least one aromatic group. In certain embodiments, the aromatic diacid compound includes terephthalic acid.

As used herein, the term "aliphatic glycol compound" means a glycol compound having aliphatic hydrocarbon groups binding to the terminal hydroxy groups. Examples of the aliphatic glycol compound may include, but are not limited to, ethylene glycol, butanediol, hexanediol, diethylene glycol, triethylene glycol, polyethylene glycol, and combinations thereof.

In certain embodiments, the first mixture includes terephthalic acid, butanediol, diethylene glycol and polyethylene glycol. In the first mixture, terephthalic acid, butanediol, diethylene glycol and polyethylene glycol may be present in a molar ratio of 80-110:50-80:15-40:5-25.

Second Polymer

The second polymer is obtained from polycondensation of a second mixture including a lactam compound, a diamine compound and a dicarboxylic acid compound. The second polymer is capable of assisting dispersion of the carbon nanotubes in the polyamide.

As used herein, the term "lactam compound" refers to a heterocyclic hydrocarbon containing an amide bond in the ring (i.e., a cyclic amide). Examples of the lactam compound may include, but are not limited to, caprolactam, dodecane-12-lactam, and a combination thereof.

As used herein, the term "diamine compound" refers to a reagent including at least two amino groups independently selected from a primary amino group and a secondary amino group. In certain embodiments, the diamine compound includes hexamethylene diamine.

Examples of the dicarboxylic acid compound may include, but are not limited to, adipic acid, azelaic acid, sebacic acid, dodecanedioic acid, benzenedicarboxylic acid, naphthalic acid, and combinations thereof.

In certain embodiments, the second mixture includes caprolactam, dodecane-12-lactam, hexamethylene diamine and adipic acid. In the second mixture, caprolactam, dodecane-12-lactam, hexamethylene diamine, and adipic acid may be present in a molar ratio of 25-55:25-50:5-25:5-25.

The first component may be present in an amount ranging from 0.2 wt % to 4 wt % based on a total weight of the conductive polymeric composition. When the amount of the first component is lower than 0.2 wt %, the carbon nanotubes would not be able to disperse evenly in the polymeric component, resulting in blockage of the spinneret due to aggregation of the carbon nanotubes, thereby reducing spinnability of the conductive polymeric composition. When the amount of the first component is greater than 0.4 wt %, the difference in the molecular chain length between the first component and the polymeric component may cause an increase of a polydispersity index (PDI) of the resultant conductive polymeric composition, which is prone to cause filament breakage during the spinning process. In addition, the first component present in an excess amount may overly accumulate around the carbon nanotubes, leading to a product to be made exhibiting a reduced conductivity. In certain embodiments, the amount of the first component may be 0.5 wt %, 0.7 wt %, 0.9 wt %, 1 wt %, 1.5 wt %, 2 wt %, 2.5 wt %, 3 wt % or 3.5 wt %.

Second Component

The second component is made by the esterification of a $C_{16}$-$C_{30}$ fatty acid with a polyol compound.

Examples of the $C_{16}$-$C_{30}$ fatty acid may include, but are not limited to, montanic acid, stearic acid, palmitic acid, arachidic acid, lignoceric acid triacontanoic acid, and combinations thereof.

As used herein, the term "polyol" includes compounds, monomers, oligomers and polymers including at least two hydroxyl groups (such as glycols) or at least three hydroxyl groups (such as triols), higher functional polyols and mixtures thereof. Examples of the polyol compound may include, but are not limited to, glycol, propanetriol, pentaerythritol, and combinations thereof. The polyol is used to conduct esterification with the $C_{16}$-$C_{30}$ fatty acid, so as to link molecules of the $C_{16}$-$C_{30}$ fatty acid together.

The applicants also note the problems associated with the carbon nanotubes, i.e., a bad dispersion and easy self-twisting. Specifically, when the carbon nanotubes are in a tubular form, there is a considerable difference between the size along a lengthwise direction and the size along a radial-wise direction. Under the influences of entropy and surface energy, the carbon nanotubes tend to twist around one another similar to that observed in the polymer. When the carbon nanotubes twist into a spherical or aggregated form, and are no longer present in the tubular form that extends along a extension direction of the filaments to be made, the space occupied by the carbon nanotubes in the filaments or the cross-sections of spinneret holes may be greatly increased, causing the blockage of the spinneret holes and thus, results in breakage of the filaments. In order to solve the aforesaid problems, the second component is introduced into the conductive polymeric composition to reduce self-twisting of the carbon nanotubes, and to prevent the issue of filament breakage.

The second component is present in an amount ranging from 0.1 wt % to 4 wt % based on a total weight of the conductive polymeric composition. When the amount of the second component is lower than 0.1 wt %, the self-twisting phenomenon of carbon nanotubes may not be sufficiently reduced and thus cannot effectively solve the issue of filament breakage for the purpose of mass production. When the amount of the second component is greater than 4 wt %, the fraction between the melted materials and a screw may be too small to conduct extrusion, which might lead to retention of the materials in the melt channel for a time period that is too long, causing cracking and carbonization thereof. The resulting carbonized product may thus block the spinneret holes and cause filament breakage. In addition, the second component present in an excess amount may overly accumulate around the carbon nanotubes, leading to a product to be made exhibiting a poor conductivity. In certain embodiments, the amount of the first component may be 0.5 wt %, 0.6 wt %, 0.7 wt %, 0.8 wt %, 0.9 wt %, 1 wt %, 1.5 wt %, 2 wt %, 2.5 wt %, 3 wt % or 3.5 wt %.

The conductive polymeric composition may further include a conductive carbon black. The conductive carbon black is capable of not only cooperating with the carbon nanotubes to form a desired point-to-line conductive network, but also lowering the energy barrier to transport electrons between the carbon nanotubes so as to increase the conductivity of a product to be made. Apart from the above, the addition of the conductive carbon black may also assist in enhancing the compatibility between the carbon nanotubes and the polymeric component, so as to improve the dispersion of the carbon nanotubes and preventing self-twisting thereof, thereby increasing the isotropic properties of the carbon nanotubes. As such, the amount of the carbon nanotubes added in the conductive polymeric composition may be further increased.

In certain embodiments, the conductive carbon black is present in an amount ranging from 0.5 wt % to 5 wt % based on the total weight of the conductive polymer composition. When the amount of the conductive carbon black is lower than 0.5 wt %, the conductivity may not be effectively enhanced. When the amount of the conductive carbon black is greater than 0.5 wt %, the conductive carbon black may form cluster and exhibit poor dispersion. In certain embodiments, the amount of the conductive carbon black may be 1 wt %, 2 wt %, 3 wt %, or 4 wt %.

The conductive polymeric composition may further include an antioxidant for stabilizing polymers.

Due to the advantageous effect of the conductive polymeric composition as mentioned above, the present disclosure also provides a fiber yarn made therefrom which exhibits superior antistatic or conductive properties, and may be scalable to provide economic value and promote industrial development.

The fiber yarn includes a plurality of filaments, each of which is made from the conductive polymeric composition as mentioned above. In certain embodiments, the fiber yarn includes 4 to 72 of the filaments.

Referring to FIG. 1, a method for making the fiber yarn according to this disclosure includes steps S1 to S3.

In step S1, the abovementioned conductive polymeric composition is provided.

In step S2, the conductive polymeric composition is compounded, e.g., using a twin-screw extruder, under heating, and then pelletized to obtain plastic pellets.

In step S3, the plastic pellets are spun into filaments, thereby obtaining the fiber yarn.

The present disclosure will be further described by way of the following examples. However, it should be understood that the following examples are intended solely for the purpose of illustration and should not be construed as limiting the present disclosure in practice.

EXAMPLES

General Experimental Materials

The materials and equipments for preparing and analyzing fiber yarns of each of the following Examples and Comparative Examples are listed in Tables 1 and 2, respectively.

TABLE 1

| Material | | Source | Model no. |
|---|---|---|---|
| Carbon nanotubes | | LG Chem Ltd. | CP 1002M (having a length ranging from 10 nm to 50 μm, and a diameter ranging from 5 nm to 7 nm) |
| First component | First polymer | EMS-CHEMIE AG | GRILTEX ® D1502E GRILTEX ® D1533E GRILTEX ® D1841E |
| | Second polymer | | GRILTEX ® D1556A |
| Second component | | Clariant | Licolub ® WE 40 |

TABLE 1-continued

| Material | Source | Model no. |
|---|---|---|
| Conductive carbon black | CABOT | VULCAN ® XCmax ™ 22 (superconductive carbon blacks) |
| Polymeric component Polyester Polyamide | Soncho Tech Ltd. | PBT IV: 1.20 dL/g PA6 RV: 2.7 |
| Antioxidant | BASF | Irganox ® 1010 |
| Dispersing agent for grinding carbon nanotubes | DuPont | WALCEL CRT (sodium carboxymethyl cellulose) |

TABLE 2

| Machine | Source | Model no. |
|---|---|---|
| Wet grinding bead mill | FRITSCH | Pulversette 5 |
| High speed grinder | Rong Tseng Precision Technology Co. | RT-12 |
| Particle size analyzer | Malvern | Mastersizer |
| Twin-screw extruder | Thermo Haake | Haake PolyLab OS |
| Fiber yarn spinning machine | Together Plastic Chemical Power Ltd. | Remodelled version |
| Resistivity meter equipped with four-point probe | Mitsubishi Chemical | MCP-T610 |

Preparation of Fiber Yarn

Example 1 (EX1)

A conductive polymeric composition is prepared by mixing, based on a total weight of the conductive polymer composition, 2 wt % of ground carbon nanotubes, 0.2 wt % of a first component, 0.1 wt % of a second component, 0.5 wt % of a conductive carbon black, 0.05 wt % of an antioxidant, and 97.15 wt % of a polymeric component. The carbon nanotubes are subjected to a grinding process as follows. Specifically, in the grinding process, a dispersing agent was first mixed with water under stirring for 5 minutes. The resultant fluid, zirconia beads and the carbon nanotubes (water, the zirconia beads, the carbon nanotubes and the dispersing agent were present in a weight ratio of 250:110:8:1) were added into a grinding pot of a wet grinding bead mill and then ground under a speed of 300 rpm for 10 hours. After the carbon nanotubes in the resultant ground product was confirmed to have a length (D90) that is longer than 0.5 μm and shorter than 1 μm by a particle size analyzer, the ground product was spray dried to obtain the ground carbon nanotubes. In this example, the ground carbon nanotubes have an average length of 0.926 μm (a length (D90) was 0.955 μm).

The first component, i.e, GRILTEX® D1841E, was purchased from EMS-CHEMIE AG. Alternatively, the first polymer may be obtained from polycondensation of terephthalic acid, butanediol, diethylene glycol and polyethylene glycol (PEG600) in a molar ratio of 100:73:19:8. The second component was purchased from Clariant. Alternatively, the second component may be made by esterification of montanic acid with pentaerythritol. The conductive carbon black was purchased from CABOT Corporation. The antioxidant was purchased from BASF. The polymeric component was a polybutylene terephthalate (PBT) product with an intrinsic viscosity (I.V.) of 1.20 dL/g (i.e., a polyester) which is purchased from Soncho Tech.

The conductive polymeric composition was dry ground using a high-speed grinder for around 4 minutes, and then dried under 105° C. for 12 hours. The dried conductive polymeric composition was compounded in a twin-screw extruder at a heating temperature set as 240° C., 280° C., 280° C., 280° C., 290° C., 290° C., 290° C., 285° C., 285° C., and then extruded and pelletized under a rotation speed ranging from 200 rpm to 250 rpm to obtain plastic pellets.

The plastic pellets were melt-spun using a fiber yarn spinning machine equipped with four heating zones each having a heating temperature set at 240° C., 250° C., 250° C. and 250° C., and then extruded through a single screw under a rotation speed of 30 rpm, so as to obtain filaments. Then, a number of the filaments are collected and wound into a running bundle, i.e., a fiber yarn of EX1 which has a denier of 240 and 16 filaments, using a filament winding machine at a speed of 200 m/min.

It should be noted that, during the spinning and winding operation, the operating temperature of the filament winding machine may be adjusted to have a difference of 10° C., the rotation speed of the single screw can may be adjusted to fall within a range of 10 rpm to 50 rpm, and the winding speed of the filament winding machine may be adjusted to fall within a range of 50 m/min and 500 m/min. The fiber yarn to be made may have a denier ranging from 220 to 240, and 4 to 72 filaments according to practical requirements.

Examples 2 to 4 (EX2 to EX4)

The procedures and conditions for preparing fiber yarns of EX2 to EX4 were similar to those of EX-1, except that the amount of each component used in the conductive polymeric composition for EX2 to EX4 were varied as shown in Table 3 below.

Examples 5 and 6 (EX5 and EX6)

The procedures and conditions for preparing fiber yarns of EX5 and EX6 were similar to those of E1, except that in EX5 and EX6, the polymeric component is Nylon-6 (PA6) product, the polyamide purchased from Soncho Tech has a relative viscosity (RV) of 2.7, and the first component is a second polymer purchased from EMS-CHEMIE AG. Alternatively, the second polymer may be obtained from polycondensation of caprolactam, poly(dodecano-12-lactam), hexamethylene diamine, and adipic acid in a molar ratio of 50:30:20:20. In addition, the amount of each component used in the conductive polymeric composition for EX5 and EX6 were also varied as shown in Table 3 below.

Examples 7 and 8 (EX7 and EX8)

The procedures and conditions for preparing fiber yarns of E7 and E8 were respectively similar to those of E2 and E6, except that the conductive carbon black was not added in the conductive polymeric composition for EX7 and EX8.

Comparative Examples 1 to 6 (CE1 to CE6)

The procedures and conditions for preparing fiber yarns of CE1 to CE3 and CE4 to CE6 were respectively similar to those of E1 and E4, except that only the carbon nanotubes and the polymeric component were used in the conductive polymeric composition for CE2, CE3, CE5 and CE6, while only the polymeric component was used in the conductive polymeric composition for CE1 and CE4. The components of the conductive polymeric composition in each of CE1 to CE6 are shown in Table 4.

Comparative Examples 7 to 10 (CE7 to CE10)

The procedures and conditions for preparing fiber yarns of CE7 to CE 10 were respectively similar to those of CE2, CE3, CE5, and CE6, except that the carbon nanotubes added in the conductive polymeric composition for CE7 to CE10 were ground for 24 hours to have an average length of 0.24 μm, and a D90 length of 0.39 μm.

Evaluations

Pressure Rise Test

Each of the fiber yarns of E1 to E8 and CE1 to CE10 was subjected to a pressure rise test according to the the procedures set forth in BS EN 13900-5:2005. The obtained rate of pressure rise (bar/30 min) may be used to evaluate the spinnability of the fiber yarn as follows.

| Rate of pressure rise (bar/30 min) | Spinnability evaluation |
| --- | --- |
| <4 | Good |
| 4 to 10 | Poor |
| >10 | Very poor |

That is, the greater the rate of pressure rise is, the poorer the spinnability of the fiber yarn is (i.e., prone to filament breakage). The results for E1 to E8 and CE1 to CE10 were respectively recorded in Tables 3 and 4.

Conductivity Test

Each of the fiber yarns of E1 to E8 and CE1 to CE10 was subjected to a conductivity test using a resistivity meter equipped with four-point probe (MCP-T610). The measured volume resistivities (Ω·cm) for E1 to E8 and CE1 to CE10 were recorded in Tables 3 and 4 below, and were evaluated as follows to determine the conductivity thereof.

| Volume resistivity (Ω · cm) | Conductivity evaluation |
| --- | --- |
| >$10^9$ | Insulative |
| $10^4$ to $10^9$ | Anti-static |
| <$10^4$ | Conductive |

It should be noted that since the resistivity meter has a detection limit of $10^7$ Ω·cm, the volume resistivity of the fiber yarn, when determined to be beyond the detection limit, would be recorded as >$10^7$ Ω·cm.

TABLE 3

|  |  | EX1 | EX2 | EX3 | EX4 | EX5 | EX6 | EX7 | EX8 |
| --- | --- | --- | --- | --- | --- | --- | --- | --- | --- |
| Carbon nanotubes | Amount (wt %) | 2 | 4 | 6 | 8 | 3 | 6 | 4 | 6 |
| First component | First polymer | D1841E | D1841E | D1841E | D1841E |  |  | D1841E |  |
|  | Second polymer |  |  |  |  | D1556A | D1556A |  | D1556A |
|  | Amount (wt %) | 0.2 | 0.4 | 0.6 | 0.8 | 0.3 | 0.6 | 0.4 | 0.6 |

TABLE 3-continued

|  |  | EX1 | EX2 | EX3 | EX4 | EX5 | EX6 | EX7 | EX8 |
|---|---|---|---|---|---|---|---|---|---|
| Second component | Amount (wt %) | 0.1 | 0.2 | 0.3 | 0.4 | 0.15 | 0.3 | 0.2 | 0.3 |
| Conductive carbon black | Amount (wt %) | 0.5 | 1.0 | 1.5 | 2.0 | 1.0 | 1.5 | 0 | 0 |
| Antioxidant | Amount (wt %) | 0.05 | 0.05 | 0.1 | 0.1 | 0.05 | 0.1 | 0.05 | 0.1 |
| Polymeric component | Polymer | Polyester | Polyester | Polyester | Polyester | Nylon | Nylon | Polyester | Nylon |
|  | Amount (wt %) | 97.15 | 94.35 | 91.50 | 88.7 | 95.50 | 91.50 | 95.35 | 93 |
|  | Total (wt %) | 100 | 100 | 100 | 100 | 100 | 100 | 100 | 100 |
| Test | Rate of pressure rise (bar/30 min) | 1.13 | 1.47 | 2.69 | 3.7 | 1.31 | 2.54 | 1.08 | 2.14 |
|  | Spinnability | Good | Good | Good | Good | Good | Good | Good | Good |
|  | Volume resistivity (Ω·cm) | $1.79 \times 10^4$ | $2.11 \times 10^1$ | $1.18 \times 10^1$ | $2.62 \times 10^0$ | $3.8 \times 10^3$ | $3.22 \times 10^1$ | $8.39 \times 10^1$ | $9.47 \times 10^1$ |
|  | Conductivity | Anti-static | Conductive | Conductive | Conductive | Conductive | Conductive | Conductive | Conductive |

TABLE 4

|  |  | CE1 | CE2 | CE3 | CE4 | CE5 | CE6 | CE7 | CE8 | CE9 | CE10 |
|---|---|---|---|---|---|---|---|---|---|---|---|
| Carbon nanotubes | Amount (wt %) | 0 | 2 | 4 | 0 | 3 | 6 | 2 | 4 | 3 | 6 |
| First component | Polymer Amount (wt %) |  |  |  |  | N/A |  |  |  |  |  |
| Second component | Amount (wt %) |  |  |  |  |  |  |  |  |  |  |
| Conductive carbon black | Amount (wt %) |  |  |  |  |  |  |  |  |  |  |
| Antioxidant | Amount (wt %) |  |  |  |  |  |  |  |  |  |  |
| Polymeric component | Polymer |  | Polyester | Polyester |  | Nylon | Nylon | Polyester | Polyester | Nylon | Nylon |
|  | Amount (wt %) | 100 | 98 | 96 | 100 | 97 | 94 | 98 | 96 | 97 | 94 |
|  | Total (wt %) |  |  |  |  | 100 |  |  |  |  |  |
| Test | Rate of pressure rise (bar/30 min) | 0 | 4.1 | >10 | 0 | 4.85 | >10 | 0.92 | 1.17 | 1.32 | 2.50 |
|  | Spinnability | Good | Poor | Very poor | Good | Poor | Very poor | Good | Good | Good | Good |
|  | Volume resistivity (Ω·cm) | >$10^{12}$ | $5.3 \times 10^6$ | $2.88 \times 10^3$ | >$10^{12}$ | $6.31 \times 10^5$ | $4.07 \times 10^3$ | >$10^7$ | | | |
|  | Conductivity | Insulative | Antistatic | Conductive | Insulative | Antistatic | Conductive | Insulative/antistatic | | | |

Note:
The volume resistivities of CE1 and CE4 were known physical properties, and are not measured.

It can be seen from Table 3 that, when the amount of carbon nanotubes, first component, second component, and polymeric component were within the restriction limit, each of the fiber yarns of E1 to E8 exhibits a desired spinnability, and has a volume resistivity lower than $2 \times 10^4$ Ω·cm, even reaching to 2.62 Ω·cm.

In addition, from the comparison between the fiber yarns of E2 and E7 and those between E6 and E8, it was found that addition of the conductive carbon black can further reduce the volume resistivity by ¼ or ⅓, respectively.

In contrast, as shown in Table 4, each of the fiber yarns of CE2, CE3, CE5 and CE6 (made from the carbon nanotubes and the polymeric component without the first and second components) has a relatively poor spinnability, indicating that the poor dispersion and self-twisting of the carbon nanotubes may be present in the conductive polymeric composition, thereby affecting the spinnability of the fiber yarns and causing filament breakage.

By comparing the fiber yarns of CE7 to CE10 respectively to those of CE2, CE3, CE5 and CE6, although the smaller size (a length lower than 0.5 μm) of the carbon nanotubes used in CE7 to CE10 would not raise the problem of spinneret blockage and even exhibit an improved spinnability, the conductivity of such fiber yarns were seriously affected, leading to a volume resistivity exceeding $10^7$ Ω·cm.

In summary, by adding the first component and the second component, the carbon nanotubes are capable of being evenly dispersed in the conductive polymeric composition of this disclosure, so that self-twisting of the carbon nanotubes can be well avoided, which can in turn solve the filament breakage issue in mass production. Meanwhile, the fiber yarn of this disclosure, which is made from the conductive polymeric composition can exhibit improved anti-static and conductive properties.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A conductive polymeric composition comprising, based on a total weight of said conductive polymeric composition:
   0.1 wt % to 10 wt % of carbon nanotubes;
   0.2 wt % to 4 wt % of a first component which is one of a first polymer and a second polymer, wherein said first polymer is obtained from polycondensation of a first mixture including an aromatic diacid compound and an aliphatic glycol compound, said aromatic diacid compound including terephthalic acid, said aliphatic glycol compound being selected from the group consisting of ethylene glycol, butanediol, hexanediol, triethylene glycol, polyethylene glycol, and combinations thereof; and wherein said second polymer is obtained from polycondensation of a second mixture including a lactam compound, a diamine compound and a dicarboxylic acid compound, said lactam compound being selected from the group consisting of caprolactam, dodecane-12-lactam, and a combination thereof, said diamine compound including hexamethylene diamine, said dicarboxylic acid compound being selected from the group consisting of adipic acid, azelaic acid, sebacic acid, dodecanedioic acid, benzenedicarboxylic acid, naphthalic acid, and combinations thereof;
   0.1 wt % to 4 wt % of a second component which is made by the esterification of a $C_{16}$-$C_{30}$ fatty acid with a polyol compound; and
   the balance being a polymeric component which is different from said first and second components,
   wherein:
      when said first component is said first polymer, said polymeric component is a polyester, and when said first component is said second polymer, said polymeric component is a polyimide; and
      said first mixture includes terephthalic acid, butanediol, diethylene glycoldiol, and polyethylene glycol that are present in a molar ratio of 80-110:50-80:15-40:5-25.

2. The conductive polymeric composition according to claim 1, wherein the $C_{16}$-$C_{30}$ fatty acid is selected from the group consisting of montanic acid, stearic acid, palmitic acid, arachidic acid, lignoceric acid, triacontanoic acid, and combinations thereof.

3. The conductive polymeric composition according to claim 1, wherein said polyol compound is selected from the group consisting of glycol, propanetriol, pentaerythritol, and combinations thereof.

4. The conductive polymeric composition according to claim 1, wherein said polyester is selected from the group consisting of polyethylene terephthalate, polybutylene terephthalate, polyhexylene terephthalate, and combinations thereof.

5. The conductive polymeric composition according to claim 1, wherein said polyamide is selected from the group consisting of Nylon-6, Nylon-6,6, Nylon-6,10, Nylon-6,12, and combinations thereof.

6. The conductive polymeric composition according to claim 1, wherein said carbon nanotubes have an average length ranging from 0.5 μm to 1 μm.

7. The conductive polymeric composition according to claim 1, further comprising 0.5 wt % to 5 wt % of a conductive carbon black based on the total weight of said conductive polymer composition.

8. The conductive polymeric composition according to claim 1, further comprising an antioxidant.

9. A fiber yarn comprising a plurality of filaments, each of which is made from said conductive polymeric composition as claimed in claim 1.

10. The fiber yarn according to claim 9, comprising 4 to 72 of said filaments.

11. A conductive polymeric composition comprising, based on a total weight of said conductive polymeric composition:
   0.1 wt % to 10 wt % of carbon nanotubes;
   0.2 wt % to 4 wt % of a first component which is one of a first polymer and a second polymer, wherein said first polymer is obtained from polycondensation of a first mixture including an aromatic diacid compound and an aliphatic glycol compound, said aromatic diacid compound including terephthalic acid, said aliphatic glycol compound being selected from the group consisting of ethylene glycol, butanediol, hexanediol, triethylene glycol, polyethylene glycol, and combinations thereof; and wherein said second polymer is obtained from polycondensation of a second mixture including a lactam compound, a diamine compound and a dicarboxylic acid compound, said lactam compound being selected from the group consisting of caprolactam, dodecane-12-lactam, and a combination thereof, said diamine compound including hexamethylene diamine, said dicarboxylic acid compound being selected from the group consisting of adipic acid, azelaic acid, sebacic acid, dodecanedioic acid, benzenedicarboxylic acid, naphthalic acid, and combinations thereof;
   0.1 wt % to 4 wt % of a second component which is made by the esterification of a $C_{16}$-$C_{30}$ fatty acid with a polyol compound; and
   the balance being a polymeric component which is different from said first and second components,
   wherein:
      when said first component is said first polymer, said polymeric component is a polyester, and when said first component is said second polymer, said polymeric component is a polyamide; and
      said second mixture includes caprolactam, dodecane-12-lactam, hexamethylene diamine, and adipic acid that are present in a molar ratio of 25-55:25-50:5-25:5-25.

12. The conductive polymeric composition according to claim 11, wherein the $C_{16}$-$C_{30}$ fatty acid is selected from the group consisting of montanic acid, stearic acid, palmitic acid, arachidic acid, lignoceric acid, triacontanoic acid, and combinations thereof.

13. The conductive polymeric composition according to claim 11, wherein said polyol compound is selected from the group consisting of glycol, propanetriol, pentaerythritol, and combinations thereof.

14. The conductive polymeric composition according to claim 11, wherein said polyester is selected from the group consisting of polyethylene terephthalate, polybutylene terephthalate, polyhexylene terephthalate, and combinations thereof.

15. The conductive polymeric composition according to claim 11, wherein said polyamide is selected from the group consisting of Nylon-6, Nylon-6,6, Nylon-6,10, Nylon-6,12, and combinations thereof.

16. The conductive polymeric composition according to claim 11, wherein said carbon nanotubes have an average length ranging from 0.5 μm to 1 μm.

17. The conductive polymeric composition according to claim 11, further comprising 0.5 wt % to 5 wt % of a conductive carbon black based on the total weight of said conductive polymer composition.

18. The conductive polymeric composition according to claim 11, further comprising an antioxidant.

19. A fiber yarn comprising a plurality of filaments, each of which is made from said conductive polymeric composition as claimed in claim 11.

20. The fiber yarn according to claim 19, comprising 4 to 72 of said filaments.

* * * * *